(12) United States Patent
Rist et al.

(10) Patent No.: US 11,414,121 B2
(45) Date of Patent: Aug. 16, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Sascha Rist, Hard (AT); Helmut Kirmsze, Schaan (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/265,425

(22) PCT Filed: Aug. 7, 2019

(86) PCT No.: PCT/EP2019/071203
§ 371 (c)(1),
(2) Date: Feb. 2, 2021

(87) PCT Pub. No.: WO2020/035364
PCT Pub. Date: Feb. 20, 2020

(65) Prior Publication Data
US 2021/0309282 A1    Oct. 7, 2021

(30) Foreign Application Priority Data

Aug. 14, 2018    (DE) ...................... 10 2018 213 679.3

(51) Int. Cl.
*B62D 1/187*    (2006.01)
*B62D 1/181*    (2006.01)
*B62D 1/184*    (2006.01)

(52) U.S. Cl.
CPC ............. *B62D 1/187* (2013.01); *B62D 1/181* (2013.01); *B62D 1/184* (2013.01)

(58) Field of Classification Search
CPC ......... B62D 1/187; B62D 1/181; B62D 1/184
See application file for complete search history.

(56) References Cited

U.S. PATENT DOCUMENTS 10,773,746 B2 *    9/2020    Kirmsze ............... B62D 1/187
2005/0284251 A1    12/2005    Inayoshi
(Continued)

FOREIGN PATENT DOCUMENTS

CN    101380965 A    3/2009
CN    107567408 A    1/2018
(Continued)

OTHER PUBLICATIONS

English Translation of International Search Report issued in PCT/EP2019/071203, dated Nov. 6, 2019.

*Primary Examiner* — Drew J Brown
(74) *Attorney, Agent, or Firm* — thyssenkrupp North America, LLC

(57) ABSTRACT

A steering column may include a casing unit in which a steering spindle is rotatably mounted about a longitudinal axis and which is connectable via a height adjustment lever to a vehicle. The height adjustment lever has two opposing sidewalls between which the casing unit is received pivotably about a joint axis. The casing unit may have guide grooves that extend in a direction of the longitudinal axis. A sliding body may be disposed between each sidewall and the casing unit. Each sliding body may be displaceable in a sliding manner in a guide groove in the direction of the longitudinal axis and is supported on the respective sidewall. A supporting element may be arranged between each sliding body and the respective sidewall, which supporting element is supported from the inside against the respective sidewall and pushes the respective sliding body from the outside into the respective guide groove.

20 Claims, 5 Drawing Sheets

(56) References Cited

U.S. PATENT DOCUMENTS

| | | | |
|---|---|---|---|
| 2009/0064814 A1 | 3/2009 | Tanaka | |
| 2011/0162904 A1 | 7/2011 | Yoon | |
| 2015/0251683 A1* | 9/2015 | Caverly | B62D 1/181 74/493 |
| 2016/0252133 A1* | 9/2016 | Caverly | B62D 1/185 74/493 |
| 2017/0282960 A1* | 10/2017 | Matsuno | B62D 1/195 |
| 2018/0086363 A1* | 3/2018 | Stinebring | B62D 1/181 |
| 2018/0093697 A1 | 4/2018 | Forte et al. | |

FOREIGN PATENT DOCUMENTS

| | | | |
|---|---|---|---|
| DE | 102007039361 A1 * | 5/2008 | B62D 1/181 |
| JP | 201281809 A | 4/2012 | |
| JP | 2019104368 A | 6/2019 | |
| WO | 2018127590 A | 7/2018 | |

* cited by examiner

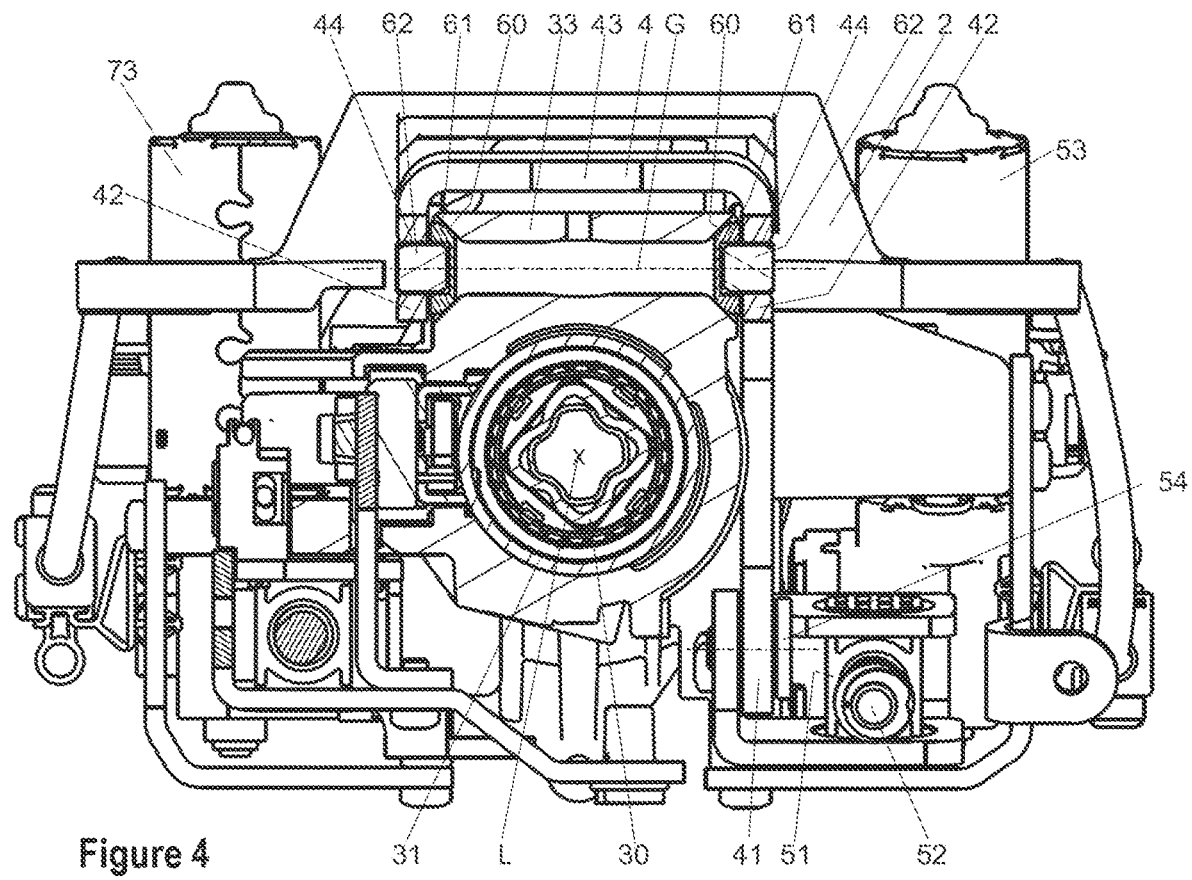

STEERING COLUMN FOR A MOTOR VEHICLE

CROSS REFERENCE TO RELATED APPLICATIONS

This application is a U.S. National Stage Entry of International Patent Application Serial Number PCT/EP2019/071203, filed Aug. 7, 2019, which claims priority to German Patent Application No. DE 10 2018 213 679.3, filed Aug. 14, 2018, the entire contents of both of which are incorporated herein by reference.

FIELD

The present disclosure generally relates to steering columns for motor vehicles.

BACKGROUND

Adjustable steering columns are known in various embodiments in the prior art for adjustment of the steering wheel position to the seat position of the driver of a motor vehicle. The steering wheel fitted at the rear end of the steering spindle can in the case of generic steering columns be positioned by a height adjustment transverse to the direction of the steering spindle longitudinal axis at the top or bottom in the vehicle interior.

For the purpose of height adjustment, the casing unit is mounted on the body in its end region, which is at the front in the direction of travel and at the bottom in relation to the steering wheel position, pivotably about a height adjustment axis which lies horizontally and thus transversely to the longitudinal axis. The adjustment movement is transmitted by an adjusting drive, for example, an electromotively driven spindle drive, via a height adjustment lever to the casing unit, such as described, for example, in US 2018/0086363 A1.

The adjusting drive engages on the input side on the height adjustment lever which is mounted pivotably about a pivot axis on a bearing unit which can be attached in a fixed manner to the body. In relation to the pivot axis on the output side, the height adjustment lever is articulated via a joint axis on the casing unit. The joint axis extends transversely to the longitudinal axis through two sidewalls which project downward of the height adjustment lever which is U-shaped in cross section, between which the casing unit is held.

Due to the fact that the pivot axis of the height adjustment lever has a distance to the height adjustment axis of the casing unit, the joint axis is displaced in the direction of the longitudinal axis translationally relative to the height adjustment axis during height adjustment.

In order to balance out this translational displacement, it is proposed in US 2018/0086363 A1 to form a balancing guide between the height adjustment lever and the casing unit, which balancing guide enables a linear balancing movement of the joint axis relative to the casing unit in the direction of the longitudinal axis during adjustment.

The known balancing guide comprises two guide grooves extended on the outside on the casing unit in the direction of the longitudinal axis, which guide grooves are arranged on opposite outer sides in each case with their opening facing the inside of a sidewall. Correspondingly, wedge-shaped sliding bodies are arranged displaceably in the guide grooves formed as keyways. A pivot bolt which passes along the joint axis through both sidewalls extends through both sidewalls and both sliding bodies. As a result of this, the sliding bodies are displaceable in the guide grooves and supported in the direction of the longitudinal axis on the sidewalls.

In order to ensure the rigidity of the steering column, the sliding guide must be adjusted to be as free from play as possible. This can be achieved in that the sliding bodies are pushed, i.e. tensioned from the outside into the guide grooves with a predefined pretensioning force which is as uniform as possible.

In stated US 2018/0086363 A1, the pretensioning force can be adjusted in that the two sidewalls are tensioned against one another in the manner of a vice and thus against the casing unit by the pivot bolt formed as a screw bolt. One disadvantage is that the screw bolt passes through the two sliding bodies, and as a result of the rigid tensioning when tightening the screw bolt the pretensioning force cannot be adjusted with sufficient precision. Moreover, as a result of the rigid tensioning, the pretensioning force reacts sensitively to dimension tolerances and changing operating conditions, as a result of which the quality of guidance is impaired. Moreover, the pretensioning force reduces significantly over the service life as a result of ageing effects on the sliding bodies and the corresponding contact surfaces with which the sliding body interacts.

Thus a need exists for a steering column with improved guidance, which can be adjusted more easily and which is more robust during operation.

BRIEF DESCRIPTION OF THE FIGURES

FIG. 4 is a cross-sectional view through the steering column of FIG. 1.

FIG. 5 is a detailed view of the cross section according to FIG. 3 along a joint axis through a supporting element in one example.

FIG. 6 is a schematic view depicting mounting of a supporting element according to FIG. 5.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may comprise a casing unit in which a steering spindle is rotatably mounted about a longitudinal axis and which can be connected directly or indirectly via a height adjustment lever to the body of a motor vehicle. The height adjustment lever may have two sidewalls between the insides of which, which are opposite to one another in relation to the longitudinal axis, the casing unit is received pivotably about a joint axis. The casing unit may have guide grooves that are extended in a direction of the longitudinal axis. In each case at least one sliding body may be arranged between a sidewall and the casing unit, which sliding body is displaceable in a sliding manner in a guide groove in the direction of the longitudinal axis and is supported on a sidewall. A method for producing such a steering column is also disclosed.

Figure 9:
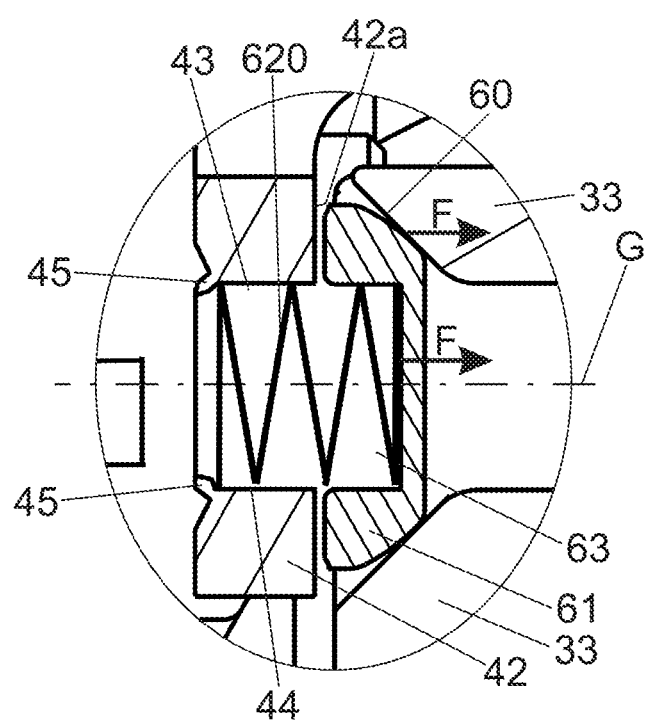
FIG. 9 is a detailed, cross-sectional view illustrating a spring element exerting a pretensioning force as an elastic spring force on a sliding body.

FIG. 9 is a detailed, cross-sectional view illustrating a spring element exerting a pretensioning force as an elastic spring force on a sliding body.

In the case of a steering column for a motor vehicle, comprising a casing unit in which a steering spindle is rotatably mounted about a longitudinal axis and which can be connected directly or indirectly via a height adjustment lever to the body of a motor vehicle, wherein the height adjustment lever has two sidewalls between the insides of which, which are opposite to one another in relation to the longitudinal axis, the casing unit is received pivotably about a joint axis, and the casing unit has guide grooves which are extended in the direction of the longitudinal axis, wherein in each case at least one sliding body is arranged between a sidewall and the casing unit, which sliding body is displaceable in a sliding manner in a guide groove in the direction of the longitudinal axis and is supported on a sidewall, it is provided according to the invention that in each case one supporting element is arranged between a sliding body and a sidewall, which supporting element is supported from the inside against the sidewall and pushes the sliding body from the outside into the guide groove.

A key difference to the prior art is that no continuous threaded bolt between the sidewalls is present, rather instead, mounting of the casing unit is performed in the height adjustment lever via two separate supporting elements. The two supporting elements are formed separately from one another in the direction of the pivot axis and are spaced apart from one another at least with the distance of the guide grooves. The pivot axis is thus axially interrupted. The supporting elements according to the invention do indeed also exert the pretensioning force directed from both sides against the casing unit on the sliding bodies, but the transmission of force is performed in each case from a sidewall and via the U-shaped or bow-shaped height adjustment which connects these, and thus not as in the prior art via the pivot axis.

In the case of the invention, the pretensioning force is introduced in each case from the sidewalls via the supporting elements to the sliding bodies and from there into the sliding grooves of the casing unit.

Due to the fact that the sliding bodies are supported via the supporting elements according to the invention from the inside, i.e. transverse to the longitudinal axis as seen from the casing unit to the outside against the insides of the sidewalls, the entire pretensioning force acts in the direction of a spreading apart of the sidewalls to the outside so that these are subject to bending to the outside. The bending strain is prevented in the prior art by the continuous threaded bolt which connects the sidewalls in the region of the sliding bodies rigidly to one another.

Due to the fact that according to the invention the sidewalls are subject to bending by the pretensioning force, the advantageous possibility arises of adjusting the pretensioning force with greater precision via the definition of the bending stiffness of the sidewalls and the amount of bending through by the supporting elements. The elastic restoring force of the sidewalls generates the resilient pretensioning force. This elastic restoring force has the possibility of actively balancing out the wear which occurs over the service life on the sliding bodies and the sidewall and thus also of providing a sufficiently high pretensioning force at the end of the service life so that a reliable operation of the steering column can be ensured over the entire service life.

The elasticity or bending stiffness of the sidewalls can be predefined via the modulus of elasticity of the material used, preferably steel, the material thickness and the geometric shape. For example, a lower material thickness or a higher elasticity in the case of a magnitude of bending defined by the supporting elements leads to a lower pretensioning force, and vice versa a greater material thickness or a lower elasticity leads to a higher pretensioning force in the case of a given bending.

The bending moment effectively introduced into the sidewalls via the supporting elements can furthermore be adjusted by the geometric arrangement of the pivot axis at the height adjustment lever. The closer the supporting elements are arranged to the free end of the sidewalls of the profile, which is U-shaped in cross section of the height adjustment lever, the greater the active bending moment in the case of a given pretensioning force. The bending through for a given pretensioning force is correspondingly larger, or the pretensioning force which can be achieved for a maximally admissible bending through is lower than if the supporting elements engage closer to the connecting region of the sidewalls with the height adjustment lever, as a result of which the arrangement has a higher degree of rigidity.

As a result of the configuration of the sidewalls, an elasticity characteristic which is flat at least in regions can be predetermined, in the case of which dimension tolerances or changing operating conditions only have small effects on the active pretensioning force. As a result of this, the adjustment of the pretensioning force is also simplified.

According to the invention, the sidewalls can have spring elements which exert the pretensioning force as elastic spring force on the sliding bodies via the supporting elements. As described above, the sidewalls themselves can be formed as bending springs or have portions which are bending-elastic in portions. The height adjustment lever can be formed as a type of spring bow, between the freely projecting sidewalls of which the casing unit is elastically clamped. In this case, "freely projecting" means that the sidewalls are not, as in the prior art, rigidly connected to one another by a continuous threaded bolt. It is conceivable and possible that, alternatively or additionally, spring elements are attached to or formed on the height adjustment lever, for example, plate, wave or disc springs which are inserted between the sidewalls and the supporting elements and/or the sliding bodies. As a result of this, further possibilities arise for adjusting the elasticity characteristic to the respective requirements of a steering column.

The height adjustment lever is preferably formed as a spring element. According to the invention, the sidewalls can thus exert the pretensioning force as elastic spring force on the sliding bodies via the supporting elements.

The height adjustment lever preferably has a wall thickness which is greater than or equal to 5 mm. The height adjustment lever is preferably formed from steel, wherein the sidewalls and the height adjustment lever preferably form a one-piece integral component, particularly preferably a sheet metal-bending component.

In one advantageous further development, the height adjustment lever has between the sidewalls a connecting part which extends between the sidewalls and connects these to one another, wherein the connecting part is free from coupling portions. The connecting part of the height adjustment lever is thus coupling-free, i.e. the connecting part is not coupled to other components or assemblies, apart from the sidewalls. This connecting part which extends between the sidewalls of the height adjustment lever thus serves exclusively to provide a predetermined rigidity to form the height adjustment lever as a spring element.

The connecting part can preferably have at least one structure-stiffening portion, for example, one or more beads which preferably extend transversely to the longitudinal axis. As a result of this, an increase in the rigidity in a specific direction, for example, in the longitudinal direction can be performed in a targeted manner. A lower rigidity is present transverse to the extension of the structure-stiffening portions so that a predetermined elasticity and spring force can be defined.

The pretensioning force is particularly preferably provided solely by the bending stiffness of the height adjustment lever. No further and separate pretensioning elements are thus necessary. Additional spring elements which act between the sidewalls and the sliding bodies can thus be dispensed with, as a result of which the production and mounting outlay can be reduced.

It is advantageous that a supporting element and a sidewall have positive-locking elements which can be connected to one another in a positive-locking manner, for the formation of a positive-locking connection acting in the direction of the longitudinal axis. As a result of this, the supporting bodies can be supported in the direction of the longitudinal axis on the sidewalls so that they can be carried along by the sidewalls in the case of a height adjustment in the direction of the longitudinal axis relative to the casing unit.

It is preferably provided that a positive-locking element comprises a bearing journal which is mounted rotatably in a bearing bore about the joint axis. The bearing bore forms as a positive-locking receiver a corresponding positive-locking element into which the bearing journal can engage in a positive-locking manner. For example, a supporting element can have a cylindrical bearing journal or be formed as such, which is mounted rotatably in a cylindrical bearing bore in a sidewall and/or a sliding body supported thereon. Preferably, but not necessarily, bearing journals of the same type can be arranged on both sides of the casing unit. Alternatively or additionally, a bearing bore can be formed in the sliding body or the supporting element, or a bearing journal on a sidewall, or bearing bores in the sliding body and in the associated sidewall.

It can be provided that a bearing bore is formed as a blind bore. Such a blind bore can be incorporated in a supporting body, a sliding body and/or in a sidewall. The supporting element can be formed as a preferably cylindrical bearing journal which is supported against the base of a blind bore in a sliding body and/or in a sidewall in the direction of the joint axis. The term blind bore refers to a bore which has either a continuously closed base or as a base has at least one stop element which projects into the bore cross section, for example, a projecting step which runs around on the inside into the bore cross section or also at least one projection which protrudes inward in portions over the circumference or the like. The pretensioning force can then be transmitted via the base of one of the blind bores or both blind bores via the supporting element used therein as a bearing journal to the sidewall and/or the sliding body.

It can be provided that a bearing journal has a threaded portion which is screwed into a threaded bore of the sidewall. The sidewall can have a continuous threaded bore in the direction of the joint axis, through which threaded bore the bearing journal is screwed until it contacts the sliding body, for example, enters into a blind bore incorporated therein as a bearing bore up to the stop at the base. By further tightening of the threaded portion, the sliding body is tensioned by the supporting element between the sidewall and the casing unit. In this case, the exerted pretensioning force is successively increased, which involves an elastic deformation as a result of bending strain of the sidewall. As a result of this, the pretensioning force can be adjusted sensitively and precisely, and is maintained over the service life. In order to permanently fix the adjustment of the pretensioning force, a substance-to-substance fixing of the threaded portion can be carried out, for example, by an adhesive, microencapsulation or coating incorporated into the thread, and additionally or alternatively by a plastic deformation, for example a caulking or the like which blocks a release of the thread.

One further possibility is that a bearing journal is supported on a holding element formed on the sidewall, which holding element comprises a plastic deformation incorporated into the sidewall, preferably from the outside, preferably a local plastic deformation. This holding element can be formed by a base in the sense of the definition indicated above. A sidewall can have, for example, a bearing bore though which a bearing journal can be pushed from the outside until it loads a sliding body with a predefined pretensioning force. As a result of a plastic deformation, for example, a caulking which projects inwards into the cross section of the bearing bore, the bearing journal can be supported axially, i.e. in the direction of the joint axis to the outside on the sidewall. The set pretensioning force is, as a result, transmitted from the sidewall via the caulking to the supporting element, and from this to the sliding body. In this manner, during manufacture of the steering column, the pretensioning force can be easily adjusted and permanently and undetachably fixed by the plastic deformation. At least two caulkings are preferably provided, particularly preferably four, which are distributed preferably evenly over the circumference of the bearing bore.

One further development provides that a sliding body is formed in one piece with a supporting element. A supporting element can be formed as a bearing stump or bearing projection, preferably with a cylindrical cross section, on the sliding bodies. The supporting element preferably projects to the outside as seen from the casing unit and can engage in a corresponding positive-locking receiver or recess on the inside in the sidewall. Manufacture can be performed, for example, as a sintered part or as a cold-formed part composed of steel, non-ferrous metal or another material.

One advantage of the embodiments described above is that a bearing journal can at the same time serve as a positive-locking element acting in the direction of the longitudinal axis, as a joint axis and as a force-transmission element for the transmission of the pretensioning force.

The guide groove is preferably formed as a keyway with a trapezoidal cross section. The sliding bodies are formed in a corresponding manner and configured, for example, to also be trapezoidal or also rounded in cross section so that they lie superficially or linearly against the trapezoidal flanks of the keyway.

In a further advantageous further development, the sliding body can have a gothic cross-sectional profile so that the guide groove and the sliding body are in contact via two linear contacts.

The steering column according to the invention is preferably configured to be motorically adjustable such that an electromotive adjusting drive engages on the height adjustment lever. The height adjustment lever preferably has a lever arm which extends from one sidewall. For example, a spindle drive known per se can be used as an adjusting drive. The height adjustment lever can be formed in a manner known per se as a two-armed lever which is mounted rotatably about a transverse axis on a bearing unit fixed on the body. The adjusting drive is preferably coupled to the lever arm, wherein the coupling is arranged at an end of the lever arm facing away from the connecting part.

The steering column can as a result be configured to be longitudinally adjustable in the direction of the longitudinal axis in that the casing unit has a lower casing tube, often also referred to as an outer casing tube or guide box which can be connected to the body of a motor vehicle and which has the guide grooves and which accommodates an upper casing tube, often also referred to as an inner casing tube, telescopically adjustable in the direction of the longitudinal axis. A motoric adjusting drive which engages on the lower casing tube and the upper casing tube can likewise be provided for telescopic longitudinal adjustment.

In one advantageous further development, the joint axis extends orthogonally to the longitudinal axis, wherein the joint axis runs above the longitudinal axis and the lever arm of the height adjustment lever is coupled at its free end below the longitudinal axis to the adjusting drive. In other words, the pivot axis and the coupling point of the height adjustment lever with the adjusting drive are arranged on opposite sides in relation to a reference plane, wherein the reference plane runs through the longitudinal axis and this reference plane is oriented parallel to the joint axis.

The invention furthermore relates to a method for producing a steering column for a motor vehicle, comprising a casing unit in which a steering spindle is rotatably mounted about a longitudinal axis and which can be connected directly or indirectly via a height adjustment lever to the body of a motor vehicle, wherein the height adjustment lever has two sidewalls between the insides of which, which are opposite to one another in relation to the longitudinal axis, the casing unit is received, and the casing unit has guide grooves which are extended in the direction of the longitudinal axis, wherein in each case at least one sliding body is arranged between a sidewall and the casing unit, which sliding body is displaceable in a sliding manner in a guide groove in the direction of the longitudinal axis and is supported on a sidewall. This method comprises the following steps:
  Arranging in each case a supporting element between a sliding body and a sidewall,
  Applying a pretensioning force on the supporting elements with which the sliding bodies are pushed into the guide grooves,
  Fixing the supporting elements in the direction of the pretensioning force on the sidewalls.

At least one supporting element is arranged between a sliding body, which is arranged on the outside of the casing unit in the guide groove, and the inside of a sidewall, as described above for the steering column according to the invention.

In this premounted state, a pretensioning force can be applied in the direction of the pivot axis, i.e. transverse to the longitudinal axis, onto the supporting elements by means of a force-generation device, for example, a contact or extrusion punch. The supporting elements are loaded via the sliding bodies against the casing unit with the pretensioning force, i.e. pushed on with the pretensioning force into the guide groove.

If the predefined pretensioning force is reached, the fixing of the supporting elements can be performed in the direction of the pretensioning force on the sidewalls, i.e. in the axial direction of the pivot axis. As a result of the fixing, the pretensioned supporting element is supported on the sidewall. If the contact or extrusion punch of the force-generation device is now pulled back, the pretensioned supporting elements are elastically loaded by the sidewalls with the pretensioning force. The height adjustment lever is thus formed as a spring element. In other words, the height adjustment lever itself is formed as a pretensioning means which pushes the sliding bodies from the outside into the guide grooves. The height adjustment lever is preferably formed as a sole pretensioning means which pushes the sliding bodies from the outside into the guide grooves. As a result, further spring elements or the like for generating the pretensioning force can be dispensed with.

Fixing can be performed, for example, by a plastic deformation of the sidewall, for example, a caulking on the inside in a bearing bore which receives the supporting element which is performed during the application of the pretensioning force. An efficient adjustment during manufacture of the steering column can be performed by a measurement of the applied pretensioning force and automated fixing.

Fixing can alternatively or additionally also be performed by an interference fit between the supporting element and the bearing bore. The supporting element is thus pressed into the bearing bore, wherein the pressing in is stopped or terminated once the defined press-in force which corresponds to the acting pretensioning force has been reached. As a result of the existing oversize, the supporting element remains in its reached position. The coupling between supporting element and bearing bore is thus formed as a longitudinal interference fit. Alternatively, a transverse interference fit could also be used.

The sidewall preferably has an edge portion which delimits the bearing bore and which is locally plastically deformed by means of a tool for the provision of a projection which projects into the bearing bore and on which the supporting element is supported in the direction of the joint axis. The formed projections thus represent the caulking. At least two projections are particularly preferably provided, particularly preferably three or four. It can be provided that the projections are formed distributed evenly over the circumference of the edge region.

Alternatively, it is possible to screw a bearing journal with a threaded portion into a threaded bore of the sidewall until the sliding bodies are clamped with the predefined pretensioning force in the guide grooves. In this case, the pretensioning force is generated by the elastic bending stress of the sidewalls or of the height adjustment lever. If the required end value of the pretensioning force is reached, the thread can be fixed or secured, for example, as described above by substance-to-substance bonding by means of adhesive or the like and/or by positive locking by means of plastic deformation of the thread, the sidewall or the supporting element.

Figure 1:
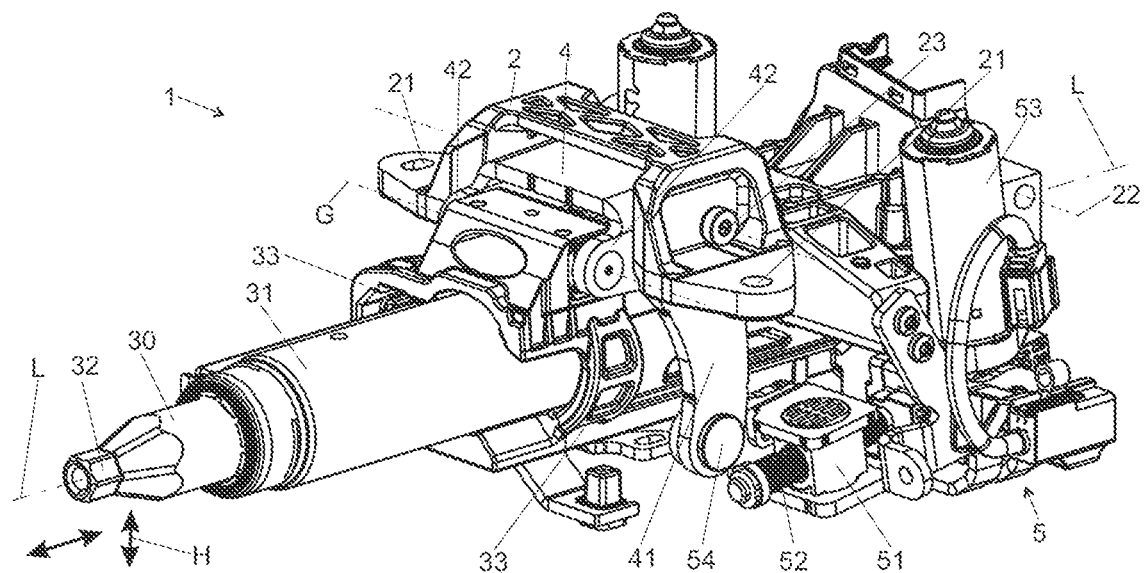
FIG. 1 is a perspective view of an example steering column.
Figure 2:
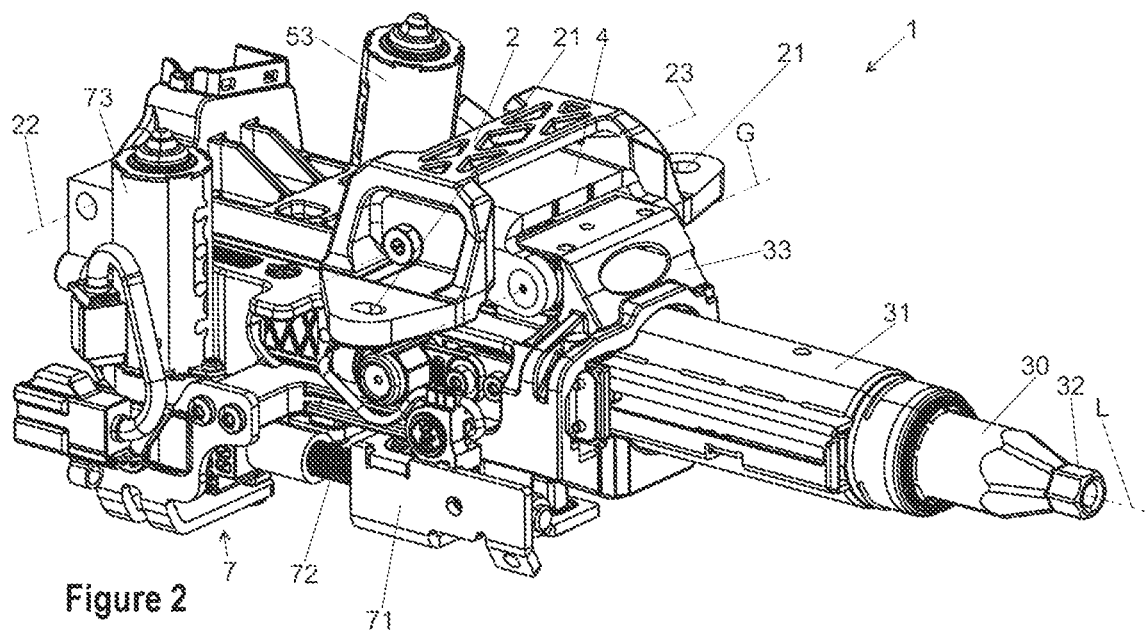
FIG. 2 is another perspective view of the steering column of FIG. 1.

A steering column 1 according to the invention is represented schematically in a perspective view obliquely from the rear (in relation to the direction of travel of a motor vehicle, not shown) in FIGS. 1 and 2.

Figure 3:
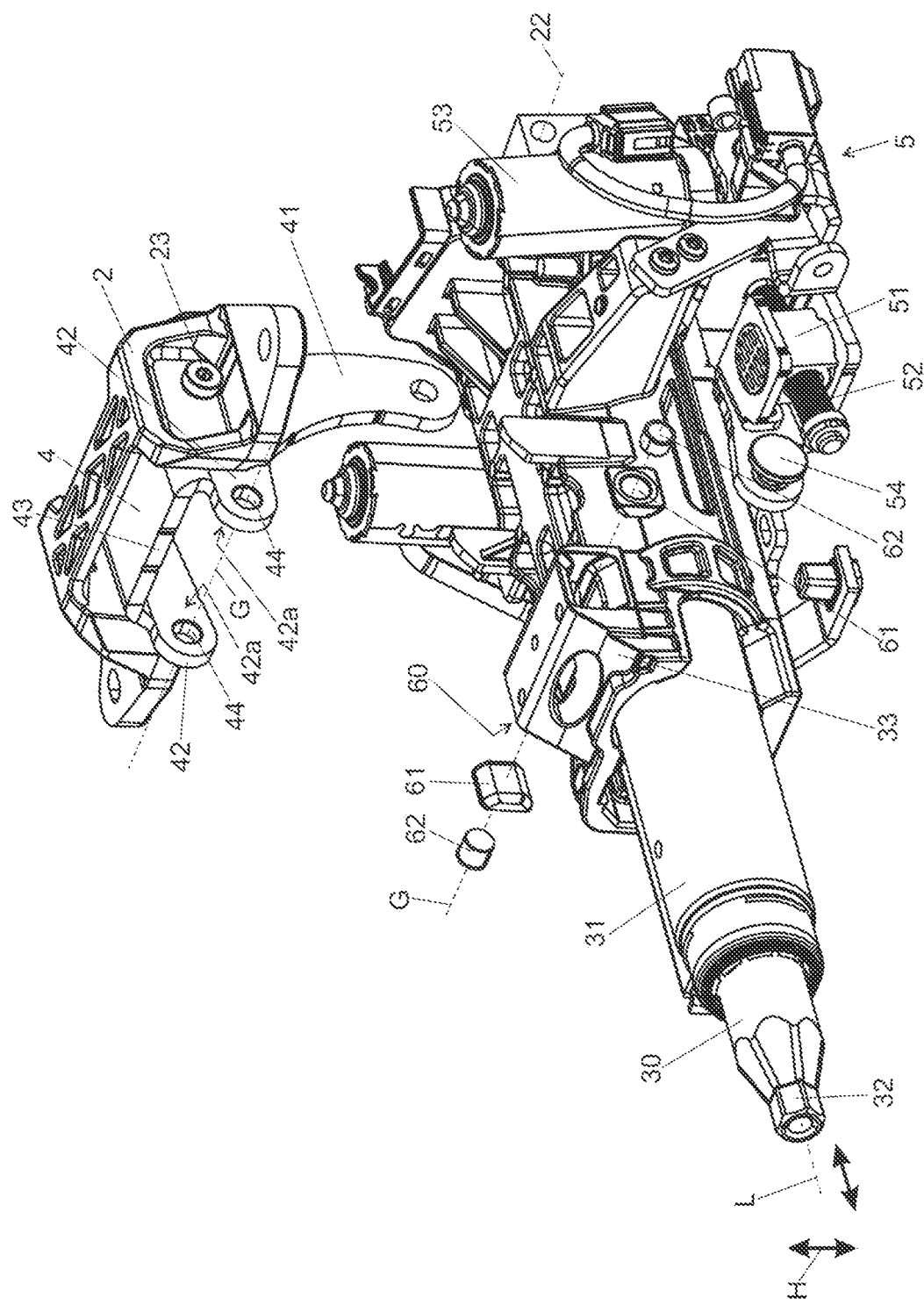
FIG. 3 is a partially-exploded perspective view of the example steering column of FIG. 1.

Steering column 1 can be fastened to the body of a motor vehicle, not represented, by means of a panel 2 which is represented raised upward in the view of FIG. 3 for the sake of clarity. Panel 2 comprises fastening means 21 for connection to the body.

A steering spindle 30 is mounted rotatably in an inner casing tube 31, also referred to as upper or inner casing tube 31, about its longitudinal axis L which extends forward in the longitudinal direction. A fastening portion 32 for fastening of a steering wheel, not represented, is formed at the rear on steering spindle 30. Inner casing tube 31 is retained to be telescopically displaceable in a casing unit 33, also referred to as outer or lower casing tube 33, in the longitudinal direction, i.e. in the direction of longitudinal axis L, as indicated with the double arrow. In terms of action, there can be provided between inner casing tube 31 and outer casing tube 33 an energy absorption apparatus which has at least one deformation element which is plastically deformed in the event of a vehicle crash. Such devices are adequately known to the person skilled in the art from the prior art.

For the purpose of height adjustment, casing unit 33 is pivotable about a horizontal height adjustment axis 22 which lies in the lower region or front region in relation to the direction of travel so that a steering wheel attached at the rear or top on fastening portion 32 is adjustable upward or downward in height direction H.

A height adjustment lever 4 is mounted rotatably on supporting unit 2 about a lever axis 23 which lies horizontally, transverse to longitudinal axis L. A motoric adjusting drive 5 which is formed as a rotational spindle drive engages on an input-side lever arm 41, with a spindle nut 51 which is connected by means of a connection bolt 54 to the free end of lever arm 41. A threaded spindle 52 which can be driven rotationally by an electromotive drive unit 53 engages into spindle nut 51. Drive unit 53 is supported in the direction of longitudinal axis L on casing unit 33. As a result of a motorically driven rotation of threaded spindle 52, spindle nut 51 is moved translationally relative to casing unit 33, as a result of which height adjustment lever 4 is pivoted about height adjustment axis 23.

The output-side lever arm of height adjustment lever 4 is formed by two sidewalls 42 which extend downward from a connecting part 43 so that a U-shaped profile of height adjustment lever 4 is formed, as is clearly apparent in the pulled apart representation of FIG. 4 and the cross section of FIG. 5. The two sidewalls 42 and connecting part 43 are formed as a one-piece integral component.

Casing unit 33 is received between oppositely directed insides 42a of sidewalls 42. A joint axis G running transverse to longitudinal axis L is located in the free end region of sidewalls 42. Joint axis G is arranged above longitudinal axis L so that the axes do not intersect. Joint axis G does not pass through inner casing tube 31, in other words longitudinal axis L runs above inner casing tube 31.

Casing unit 33 is mounted pivotably about height adjustment axis 22 on a component, not represented, fixed on the vehicle. In order to balance out a translational displacement which is generated during adjustment as a result of the changing distance between joint axis G and height adjustment axis 22, also referred to as a pivot axis. This is due to the fact that casing unit 33 is pivoted about height adjustment axis 22 and height adjustment lever 4 is pivoted about lever axis 23, wherein lever axis 23 and height adjustment axis 22 are spaced apart from one another. The axes of rotational thus do not coincide so that longitudinal balancing is necessary. For this purpose, joint axis G is displaceable in the longitudinal direction, i.e. in the direction of longitudinal axis L relative to casing unit 33 through the configuration according to the invention, as explained below.

Casing unit 33 has guide grooves 60 extended in the direction of longitudinal axis L which as keyways have a trapezoidal groove cross section. Guide grooves 60 are located on both outer sides of casing unit 33 and are open toward insides 42a of sidewalls 42. A wedge-shaped sliding body 61 adapted to the groove cross section is arranged in a sliding displaceable manner in the direction of longitudinal axis L in each guide groove 60. In each case a supporting element 62 is arranged between sliding body 61 and sidewall 41.

As is apparent in FIGS. 3 and 4, the guides formed from guide grooves 60, sliding bodies 61 and supporting elements 62 lie in mirror symmetry opposite one another on both sides of a vertical mirror plane which extends parallel to longitudinal axis L and longitudinal axis L lies in this mirror plane.

Sidewalls 42 have bores 44 running in the direction of joint axis G, in which bores 44 sliding bodies 61 are supported in the longitudinal direction, i.e. in the direction of longitudinal axis L on sidewalls 42.

FIG. 5 shows in an enlarged detailed view of FIG. 4 a first embodiment of the arrangement according to the invention. Supporting body 62 is formed therein as a cylindrical bolt which is inserted into bore 44. Supporting element 62 is supported via projections 45 which protrude into the cross section of bore 44 from the inside, i.e. toward inside 42a, against sidewall 42. With the end directed counter to casing unit 33 and facing away from inside 42, supporting body 62 dips into a bearing bore 63 formed as a blind bore in sliding body 61. Supporting body 62 is supported in the direction of joint axis G on the base of bearing bore 63 from the outside against sliding body 61. The supporting body can have a chamfer at one or both ends which simplifies corresponding mounting.

During mounting, as represented schematically in FIG. 6, a pretensioning force F is exerted on supporting element 62 by means of a contact punch 80 from the outside, as a result of which sliding body 61 is itself pushed with pretensioning force F from the outside into guide groove 60.

While pretensioning force F is defined and maintained by contact punch 80, sidewall 42 is cold-formed by means of shaping tools 81 in the outer region of bore 43 for the formation of caulked projections 45 which project inward in relation to bore 43. After removal of contact punch 80 there emerges the mounting situation shown in FIG. 5 in which pretensioning force F is now transmitted by elastic bending deformation of sidewall 42 of height adjustment lever 4 via projections 45 to supporting element 62 so that sliding body 61 is pushed permanently with set pretensioning force F into guide groove 60.

It is apparent in the cross section from FIG. 4 how casing unit 33 is elastically clamped between the two sidewalls 42 via supporting elements 62 and joint axis G runs above inner casing tube 31. Joint axis G, which is arranged orthogonally to longitudinal axis L, runs above longitudinal axis L and the free end of lever arm 41, which is coupled to adjusting drive 5 via spindle nut 51, is arranged below longitudinal axis L. The axis of connecting bolt 54, which couples the free end of lever arm 41 of height adjustment lever 4 to adjusting drive 5, runs below longitudinal axis L. Joint axis G and the coupling point of height adjustment lever 4 with adjusting drive 5 are thus arranged on opposite sides of a reference plane, wherein the reference plane runs through longitudinal axis L and this reference plane is parallel to joint axis G.

Figure 7:
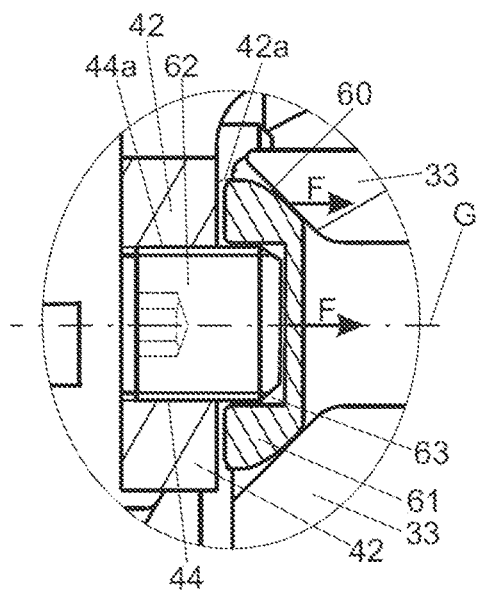
FIG. 7 is a detailed view of the cross section according to FIG. 3 along a joint axis through a supporting element in another example.

FIG. 7 shows a second embodiment in the case of which supporting body 62 is formed as a threaded bolt with an external thread which is screwed into an internal thread 44a in bore 44 into sidewall 42. The external thread and internal thread are preferably formed as metric ISO threads in accordance with DIN 13. By screwing in—to the right in the drawing—a pretensioning force F can be exerted on sliding body 61 with which it is pushed from sidewall 42 into guide groove 60. Pretensioning force F is likewise maintained by the elastic reaction force of sidewall 42 which is subject to bending.

Figure 8:
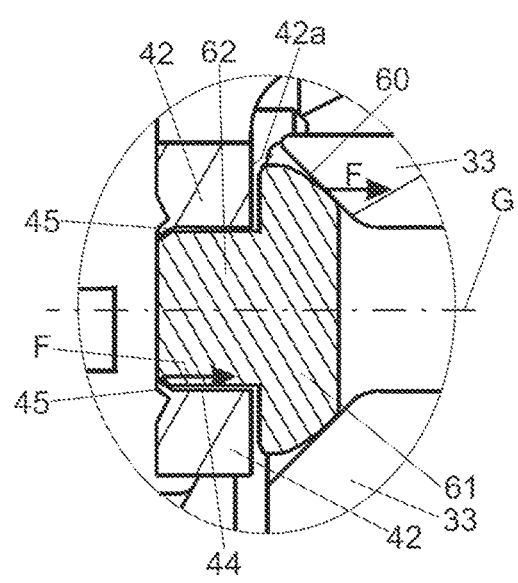
FIG. 8 is a detailed view of the cross section according to FIG. 3 along a joint axis through a supporting element in still another example.

FIG. 8 shows a further embodiment which has a similar structure to that shown in FIG. 6. In contrast to this, sliding body 61 and supporting element 62 are formed as a one-piece, integral component. The cylindrical shoulder which forms supporting body 61 is mounted rotatably in this case in bore 44.

For the purpose of length adjustment, a second adjusting drive 7 can be provided which, like the first adjusting drive 5, can be formed as a spindle drive, with a spindle nut 71 into which a threaded spindle 72, which can be driven rotationally relative thereto by a motoric drive unit 73, is screwed. Due to the fact that threaded spindle 72 is supported in the direction of longitudinal axis L on casing unit 33, and spindle nut 71 on inner casing tube 31, it can be adjusted in a telescopic manner relative to casing unit 33.

FIG. 9 depicts an example spring element 620. As mentioned above, the sidewalls 42 may have spring elements 620 that exert a pretensioning force as an elastic spring force on the sliding bodies 61.

LIST OF REFERENCE NUMBERS

1 Steering column
2 Panel
21 Fastening means
22 Height adjustment axis
23 Lever axis
30 Steering spindle
31 Inner casing tube
32 Fastening portion
33 Casing unit
4 Height adjustment lever
41 Lever arm
42 Sidewalls
43 Connecting part
44 Bore
44a Internal thread
45 Projections
5,7 Adjusting drive
51, 71 Spindle nut
52, 72 Threaded spindle
53, 73 Drive unit
54 Connecting bolt
60 Guide grooves
61 Sliding bodies
62 Supporting element
62a External thread
80 Contact punch
81 Shaping tool
F Pretensioning force
G Joint axis
H Height direction
L Longitudinal axis

What is claimed is:

1. A steering column for a motor vehicle, the steering column comprising:
a casing unit in which a steering spindle is rotatably mounted about a longitudinal axis, the casing unit being connectable directly or indirectly via a height adjustment lever to a body of the motor vehicle, wherein the height adjustment lever has two sidewalls disposed opposite one another relative to the longitudinal axis, with the casing unit being received between the two sidewalls pivotably about a joint axis, wherein the joint axis is spaced apart from and does not intersect the steering spindle, wherein the casing unit includes guide grooves that extend in a direction of the longitudinal axis, wherein a sliding body is disposed between each sidewall and the casing unit, with each sliding body being displaceable in a sliding manner in the respective guide groove in the direction of the longitudinal axis and being supported on the respective sidewall, wherein a supporting element is disposed between each sliding body and the respective sidewall, with each supporting element being supported from an inside against the respective sidewall and pushing the respective sliding body from an outside into the respective guide groove.

2. The steering column of claim 1 wherein the sidewalls include spring elements.

3. The steering column of claim 1 wherein at least one of the sidewalls and at least one of the supporting elements include positive-locking elements that are connectable to one another in a positive-locking manner to form a positive-locking connection that acts in the direction of the longitudinal axis.

4. The steering column of claim 3 wherein the positive-locking elements comprise a bearing journal that is mounted rotatably in a bearing bore about the joint axis.

5. The steering column of claim 4 wherein the bearing bore is configured as a blind bore.

6. The steering column of claim 3 wherein the bearing journal includes a threaded portion that is screwed into a threaded bore of the at least one of the sidewalls.

7. The steering column of claim 3 wherein the bearing journal is supported on a holding element formed on the at least one of the sidewalls.

8. The steering column of claim 1 wherein the at least one of the sliding bodies and at least one of the supporting elements are integral and configured as a single piece.

9. The steering column of claim 1 comprising an electromotive adjusting drive that engages the height adjustment lever.

10. The steering column of claim 1 wherein the casing unit is directly connected or is directly connectable via the height adjustment lever to the body of the motor vehicle.

11. The steering column of claim 1 wherein a shape of the sliding bodies is rotationally asymmetrical about the joint axis, wherein the shape of the sliding bodies and a shape of the guide grooves prevents the sliding bodies from rotating within the guide grooves.

12. The steering column of claim 1 wherein a shape of at least one of the sliding bodies or the guide grooves prevents the sliding bodies from rotating in the guide grooves.

13. The steering column of claim 1 wherein a plane in which the sliding bodies are configured to slide is spaced apart from and does not intersect the steering spindle.

14. The steering column of claim 1 wherein planar faces of the sliding bodies oppose one another, wherein a void exists between the planar faces of the sliding bodies where no portion of the casing unit is disposed.

15. The steering column of claim 1 wherein along the joint axis the sliding bodies protrude from the guide grooves.

16. The steering column of claim 1 wherein the sidewalls include caulked projections that project inwards relative to bores of the sidewalls that receive the supporting elements.

17. A steering column for a motor vehicle, the steering column comprising:
  a casing unit in which a steering spindle is rotatably mounted about a longitudinal axis, the casing unit being connectable directly or indirectly via a height adjustment lever to a body of the motor vehicle, wherein the height adjustment lever has two sidewalls disposed opposite one another relative to the longitudinal axis, with the casing unit being received between the two sidewalls pivotably about a joint axis, wherein the casing unit includes guide grooves that extend in a direction of the longitudinal axis, wherein a sliding body is disposed between each sidewall and the casing unit, with each sliding body being displaceable in a sliding manner in the respective guide groove in the direction of the longitudinal axis and being supported on the respective sidewall, wherein a supporting element is disposed between each sliding body and the respective sidewall, with each supporting element being supported from an inside against the respective sidewall and pushing the respective sliding body from an outside into the respective guide groove,
  wherein the casing unit includes a lower casing tube that is height-pivotable, that is connectable to the body of the motor vehicle, that includes the guide grooves, and that receives an upper casing tube in a telescopically adjustable manner in the direction of the longitudinal axis.

18. The steering column of claim 17 wherein the upper casing tube is configured to be closer to a steering wheel than the lower casing tube.

19. The steering column of claim 17 wherein the guide grooves and the sliding bodies are disposed at a location along the longitudinal axis that overlaps with the upper casing tube.

20. A method for producing a steering column for a motor vehicle that includes a casing unit in which a steering spindle is rotatably mounted about a longitudinal axis, the casing unit being connectable directly or indirectly via a height adjustment lever to a body of the motor vehicle and being pivotable about a joint axis, wherein the height adjustment lever has two sidewalls disposed opposite one another relative to the longitudinal axis, with the casing unit being received between the two sidewalls, wherein the casing unit includes guide grooves that extend in a direction of the longitudinal axis, wherein a sliding body is disposed between each sidewall and the casing unit, with each sliding body being displaceable in a sliding manner in the respective guide groove in the direction of the longitudinal axis and being supported on the respective sidewall, the method comprising:
  arranging a supporting element along the joint axis between each sliding body and the respective sidewall, with the joint axis being spaced apart from the steering spindle so as not to intersect the steering spindle;
  applying a pretensioning force on the supporting element with which the sliding bodies are pushed into the guide grooves; and
  fixing the supporting elements in a direction of the pretensioning force on the sidewalls.

* * * * *